(12) United States Patent
Ohashi et al.

(10) Patent No.: US 6,178,962 B1
(45) Date of Patent: Jan. 30, 2001

(54) SAW WIRE ASSEMBLY, CUTTING METHOD UTILIZING THE SAME, AND SYSTEM THEREFOR

(75) Inventors: Seishiro Ohashi; Misao Matsuzawa, both of Ibaraki (JP)

(73) Assignee: Hitachi Cable, Ltd., Tokyo (JP)

( * ) Notice: Under 35 U.S.C. 154(b), the term of this patent shall be extended for 0 days.

(21) Appl. No.: 09/350,245

(22) Filed: Jul. 9, 1999

(30) Foreign Application Priority Data

Aug. 27, 1998 (JP) .................................................. 10-241795

(51) Int. Cl.[7] ...................................................... B28D 1/06
(52) U.S. Cl. .................................. 125/76.01; 125/16.02; 125/12; 451/104; 83/764
(58) Field of Search ........................... 125/16.02, 16.01; 83/746; 451/164

(56) References Cited

U.S. PATENT DOCUMENTS

| | | |
|---|---|---|
| 5,519,938 | 5/1996 | Kojima et al. . |
| 6,109,253 | * 8/2000 | Ikehara ..................... 125/12 |
| 6,112,737 | * 9/2000 | Kinutani et al. .................. 125/16.02 |

FOREIGN PATENT DOCUMENTS

| | | |
|---|---|---|
| 10-138114 | 5/1998 | (JP) . |
| 10-151560 | 6/1998 | (JP) . |

* cited by examiner

Primary Examiner—David A. Scherbel
Assistant Examiner—George Nguyen
(74) Attorney, Agent, or Firm—Scully, Scott, Murphy & Presser

(57) ABSTRACT

A cutting system by which a material to be worked is cut off by the use of each of abrasive grain-bonded saw wires contained in a saw wire assembly prepared by arranging the abrasive grain-bonded saw wires on a long tape base material along the longitudinal direction thereof in such a way that they are disposed side by side in the direction perpendicular to the above described longitudinal direction, and bonding tentatively these abrasive grain-bonded saw wires onto the tape base material through an adhesive in a releasable manner, comprises means for releasing the tape base material from the saw wire assembly before it reaches the material to be worked; and means for applying a tension to the saw wire assembly and each of the abrasive grain-bonded saw wires.

6 Claims, 5 Drawing Sheets

1 SAW WIRE ASSEMBLY
2 TAPE BASE MATERIAL
11 CUTTING SYSTEM
12 DELIVERY REEL
13a, 13b CLAMPING SECTION
14 TAPE BASE MATERIAL-RELEASING ROLL
16 TAKE-UP REEL
18 TENSION-ADJUSTING ROLL
19 MATERIAL TO BE USED
20 COOLANT-SUPPLYING MEANS
21 TAKE-UP ROLL
22 GUIDE ROLL
23a, 23b SWINGING DANCER ROLL
24a, 24b GROOVED GUIDE ROLL

1 SAW WIRE ASSEMBLY
2 TAPE BASE MATERIAL
11 CUTTING SYSTEM
12 DELIVERY REEL
13a, 13b CLAMPING SECTION
14 TAPE BASE MATERIAL-RELEASING ROLL
16 TAKE-UP REEL
18 TENSION-ADJUSTING ROLL
19 MATERIAL TO BE USED
20 COOLANT-SUPPLYING MEANS
21 TAKE-UP ROLL
22 GUIDE ROLL
23a, 23b SWINGING DANCER ROLL
24a, 24b GROOVED GUIDE ROLL

1   SAW WIRE ASSEMBLY
2   TAPE BASE MATERIAL
12  DELIVERY REEL
13a, 13b  CLAMPING SECTION
14  TAPE BASE MATERIAL-RELEASING ROLL
16  TAKE-UP REEL
18  TENSION-ADJUSTING ROLL
19  MATERIAL TO BE USED
20  COOLANT-SUPPLYING MEANS
21  TAKE-UP ROLL
22  GUIDE ROLL
24a, 24b  GROOVED GUIDE ROLL
31  CUTTING SYSTEM

SAW WIRE ASSEMBLY, CUTTING METHOD UTILIZING THE SAME, AND SYSTEM THEREFOR

FIELD OF THE INVENTION

The present invention relates to a saw wire assembly, a cutting method utilizing the same, and a system therefor, and particularly to a saw wire assembly for slicing or cutting a material to be worked in a lump with the use of abrasive grain-bonded saw wires, a cutting method utilizing a saw wire assembly containing such abrasive grain-bonded saw wires, and a system therefor.

BACKGROUND OF THE INVENTION

There are two types of wire saws used generally and two kinds of manners for cutting a material with the use of such wire saws utilized generally at present.

One of the manners is that a saw wire prepared by bonding or fixing continuously or intermittently abrasive grains or cutting blades onto the surface of a wire element is employed. It is mostly in the form of a loop wherein the opposite ends of a saw wire are joined together. A manner for cutting a material to be worked is such that a looped saw wire is allowed to travel and slide simultaneously with respect to the material to be worked, thereby cutting the same.

However, since an abrasive grain-or cutting blade-fixed wire saw in the above described cutting manner is used for cutting a material to be worked in accordance with a single wire traveling, the material cannot be cutoff simultaneously into a number of pieces, so that its cutting efficiency is poor.

In this respect, a free abrasive grain manner wherein an ingot 43 is cut off by allowing a wire element 41 to slidingly travel (for example, reciprocating traveling or unidirectional traveling) with respect to the ingot 43 as shown in FIGS. 1A and 1B while pouring a processing slurry 44 prepared by kneading abrasive grains with a processing aid into the sliding position is particularly utilized in recent years for cutting off wafers from ingots (materials to be worked) of silicon, a compound semiconductor or the like. Such free abrasive grain manner is also called a multiple wire saw manner, because the operation is carried out in such that a wire element 41 is wound around a plurality of guide rollers 42a, 42b, and 42c with a number of turns, whereby a number of pieces of wafers are sliced from a material in a lump.

In order to elevate slicing performance in a multiple wire saw manner, an inexpensive abrasive grain-bonded saw wire 51a which is prepared by bonding abrasive grains 55 on the surface of a wire element 52a through a binder 54, the cross section of which being shown in FIG. 2A, and another abrasive grain-bonded saw wire 51b which is prepared by bonding abrasive grains 55 on the surface of a covering layer 53 provided on the surface of a wire element 52b through a binder 54, the cross section of which being shown in FIG. 2B have been proposed, respectively. (For example, see Japanese Patent Application Nos. 311187/1996 and 328004/1996)

For the sake of using efficiently the abrasive grain-bonded saw wire 51a or 51b, it is required to afford a tension to the abrasive grain-bonded saw wire 51a or 51b, whereby a contact force (contact pressure) with respect to a material to be worked is elevated in their sliding portion.

However, in the multiple wire saw manner as shown in FIGS. 1A and 1B, although a tension is given to the wire element 41 wound around each of the guide rolls at the opposite ends of the wire element, such tension given to the wire element 41 is not applied merely up to several turns from both of a starting portion of the winding and an ending portion of the winding with respect to each of the guide rollers 42, since the number of windings of the wire element with respect to each of the guide rollers 42 is as much as 50 to 200 times.

For this reason, a major part of the wire element 41 wound around each of the guide rollers 42 (intermediate windings) constitutes a so-called passive state region with respect to a wire tension, so that the wire tension is in an extremely low state. Accordingly, when the abrasive grain-bonded saw wire 51a or 51b shown in FIG. 2A or 2B is applied to a multiple saw wire manner, there has been such a problem that a sufficient cutting ability cannot be achieved by the abrasive grain-bonded saw wire 51a or 51b.

In the above case, although it may be also considered that a number of abrasive grain-bonded saw wires are allowed to travel in parallel to each other, so that a constant tension is afforded to each abrasive grain-bonded saw wire in a cutting section, there is a fear of coming the entire system to be very massive, besides workability for setting up the cutting system becomes worse, because each means and function are required in every single abrasive grain-bonded saw wires for delivering the same, affording tension to the same, traveling the same, and winding the same, and further since the number of saw wires are remarkable (50 to 200). On one hand, even if respective abrasive grain-bonded saw wires are collected at positions before and after stages of a cutting section, and further the respective means and functions for affording tension, traveling and winding the saw wires are processed simultaneously in a lump, delivering means are required with the number corresponding to those of the saw wires by all means.

It is to be noted, however, that the above described passive state region with respect to wire tension seems to contribute to improvements in cutting efficiency, because abrasive grains come to easily get into a gap defined between a traveling wire element and a material to be worked in a free abrasive grain manner (multiple wire saw) which is generally employed at present.

SUMMARY OF THE INVENTION

Accordingly, an object of the present invention contemplates to solve the problems as described above and to provide a saw wire assembly by which it is possible to easily handle a number of abrasive grain-bonded saw wires in case of cutting a material to be worked with use of such a large number of abrasive grain-bonded saw wires.

A further object of the present invention is to provide a cutting method by utilizing the saw wire assembly having a high cutting efficiency and a simple structure in case of cutting a material to be worked with use of a number of abrasive grain-bonded saw wires, and further to provide a system for applying such cutting method.

According to the first feature of the invention, a saw wire assembly, comprises:

a number of abrasive grain-bonded saw wires being arranged on a long tape base material along the longitudinal direction thereof in such a way that they are disposed side by side in the direction perpendicular to the longitudinal direction; and these abrasive grain-bonded saw wires being bonded tentatively onto the tape base material through an adhesive in a releasable manner.

In the above described constitution, since a number of abrasive grain-bonded saw wires are bonded tentatively onto the tape base material in a releasable manner, it becomes easy to handle each of the abrasive grain-bonded saw wires, and it is also easy to release the tape base material from the saw wire assembly prior to cutting a material to be worked.

According to the second feature of the invention, a cutting method by the use of an abrasive grain-bonded saw wire assembly, comprises the steps of:

preparing the abrasive grain-bonded saw wire assembly in accordance with such a manner that a number of abrasive grain-bonded saw wires are arranged on a long tape base material along the longitudinal direction thereof in such a way that they are disposed side by side in the direction perpendicular to the longitudinal direction, and these abrasive grain-bonded saw wires are bonded tentatively onto the tape base material through an adhesive in a releasable manner; and cutting a material to be worked by the use of the abrasive grain-bonded saw wires contained in the saw wire assembly in accordance with such a manner that the tape base material is released from the saw wire assembly before it reaches the material to be worked, and thereafter each of the abrasive grain-bonded saw wires is allowed to reciprocatively travel while applying a tension to each of the abrasive grain-bonded saw wires, thereby to cut the material to be worked.

According to the third feature of the invention, a cutting method by the use of an abrasive grain-bonded saw wire assembly, comprises the steps of:

preparing the abrasive grain-bonded saw wire assembly in accordance with such a manner that a number of abrasive grain-bonded saw wires are arranged on a long tape base material along the longitudinal direction thereof in such a way that they are disposed side by side in the direction perpendicular to the longitudinal direction, and these abrasive grain-bonded saw wires are bonded tentatively onto the tape base material through an adhesive in a releasable manner; and cutting a material to be worked by the use of the abrasive grain-bonded saw wires contained in the saw wire assembly in accordance with such a manner that the tape base material is released from the saw wire assembly before it reaches the material to be worked, and thereafter the material to be worked is allowed to reciprocatively travel along the longitudinal direction of the abrasive grain-bonded saw wire while applying a tension to each of the abrasive grain-bonded saw wires, thereby to cut the material to be worked.

In both the above described methods, since an integral tape-shaped saw wire assembly prepared by bonding tentatively a number of abrasive grain-bonded saw wires onto a tape base material in a releasable manner is used, it becomes easy to handle each of the abrasive grain-bonded saw wires, and workability for setting up such abrasive grain-bonded saw wires is improved. Furthermore, since the tape base material is released from the saw wire assembly before cutting the material to be worked, it becomes possible to apply a tension to each of the abrasive grain-bonded saw wires, whereby cutting efficiency of a material to be worked is elevated.

According to the fourth feature of the invention, a cutting system wherein an abrasive grain-bonded saw wire assembly is used by which a material to be worked is cut off by the use of each of abrasive grain-bonded saw wires contained in the saw wire assembly prepared by arranging the abrasive grain-bonded saw wires on a long tape base material along the longitudinal direction thereof in such a way that they are disposed side by side in the direction perpendicular to the longitudinal direction, and bonding tentatively these abrasive grain-bonded saw wires onto the tape base material through an adhesive in a releasable manner, comprises:

means for releasing the tape base material from the saw wire assembly before it reaches the material to be worked; and means for applying a tension to the saw wire assembly and each of the abrasive grain-bonded saw wires.

According to an embodiment of the invention, a cutting system wherein an abrasive grain-bonded saw wire assembly is used as described in the above fourth feature of the invention, further comprises:

means for traveling reciprocatively each of the abrasive grain-bonded wires to cut off the material to be worked.

According to another embodiment of the invention, a cutting system wherein an abrasive grain-bonded saw wire assembly is used as described in the above fourth feature of the invention, further comprises:

means for traveling reciprocatively the material to be worked along the longitudinal direction of each of the abrasive grain-bonded saw wires to cut off the material to be worked.

In the constitution of either of the above described cutting systems, since a saw wire assembly prepared by bonding tentatively a number of abrasive grain-bonded saw wires onto a tape base material in a releasable manner is employed, delivery means is not required in each single abrasive grain-bonded saw wire. As a result, even though a large number of wires are employed, a structure of such system becomes simple.

BRIEF DESCRIPTION OF THE DRAWINGS

The present invention will be explained in more detail in conjunction with appended drawings, wherein.

DESCRIPTION OF THE PREFERRED EMBODIMENTS

Preferred embodiments of the present invention will be described.

Figure 3:
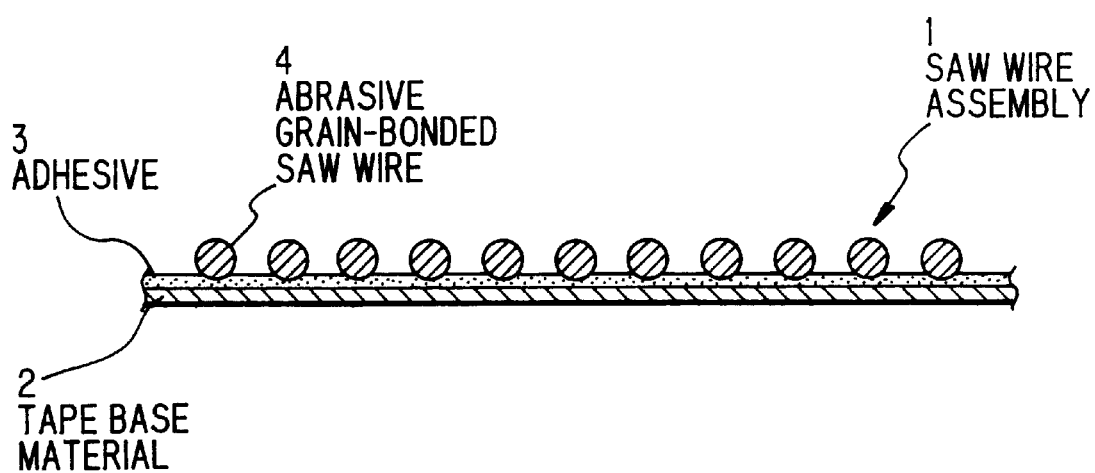
FIG. 3 is a cross-sectional view showing a saw wire assembly according to the present invention.

FIG. 3 is a cross-sectional view showing a saw wire assembly according to the present invention wherein the saw wire assembly 1 is prepared by arranging a number of abrasive grain-bonded saw wires 4 on a long tape base material 2 along the longitudinal direction thereof in such a way that they are disposed side by side in the direction perpendicular to the above described longitudinal direction, and bonding tentatively these abrasive grain-bonded saw wires 4 onto the tape base material 2 through an adhesive (binder) 3 in a releasable manner.

A material from which the tape base material 2 is to be prepared is not particularly limited, but a metallic or synthetic resin material is available. However, it is desired that such tape base material used in the present invention is prepared from a material having properties and a thickness satisfying a variety of such conditions that it is possible to support a number of the abrasive grain-bonded saw wires 4 thereon through the binder 3, that it can withstand a tension applied to the saw wire assembly 1 for cutting a material to be worked, that it is easily released from the respective abrasive grain-bonded saw wires 4 before cutting the material to be worked, and that it is preferable to have a thin thickness as thinner as possible in order to obtain a long tape base material.

A material from which the adhesive 3 is to be prepared is not particularly restricted, but it depends upon a material from which the tape base material 2 is to be prepared, and adhesion and releasability with respect to the abrasive grain-bonded saw wires 4.

Figure 1A:
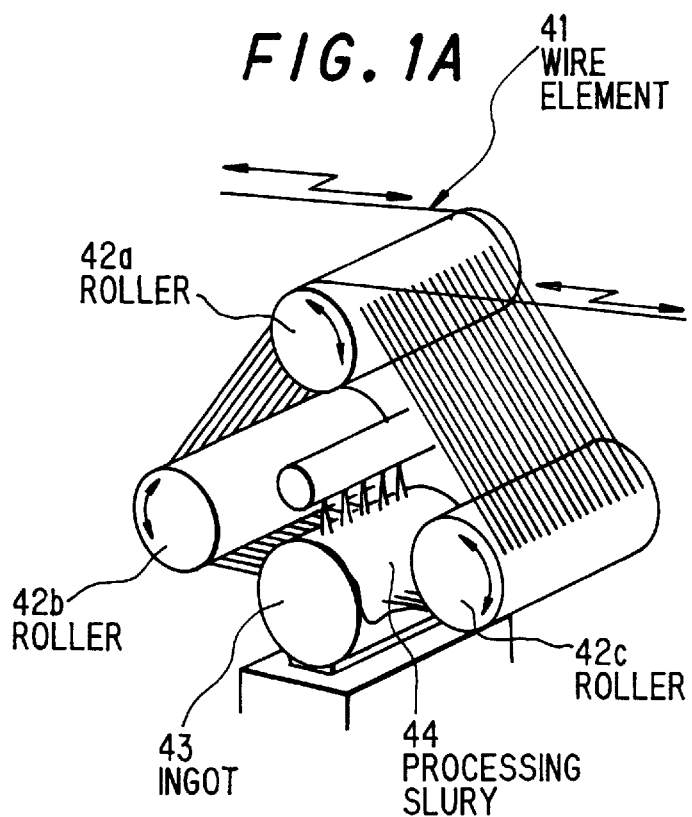
FIGS. 1A and B are perspective views each showing a cutting section in a cutting system according to a multiple wire saw manner.
Figure 1B:
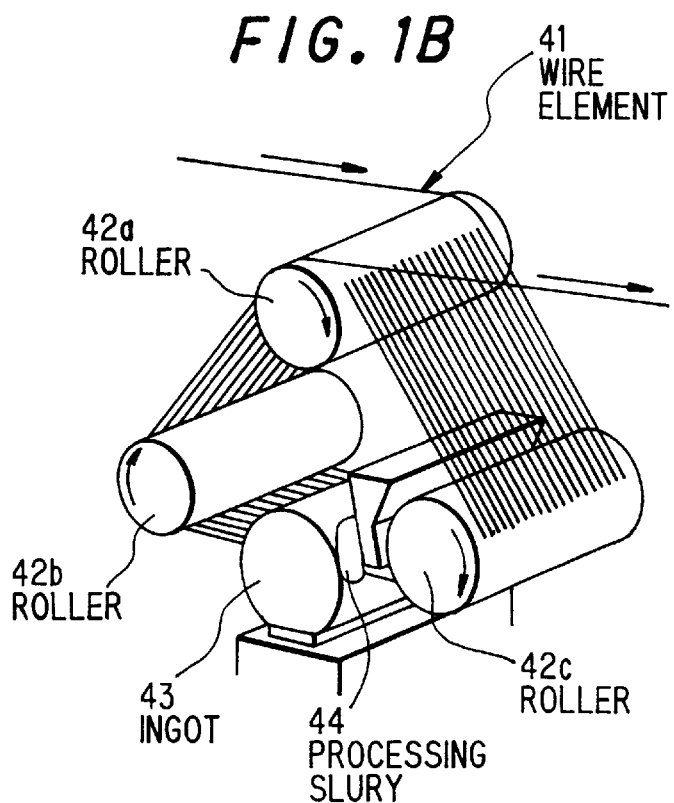
Figure 2A:
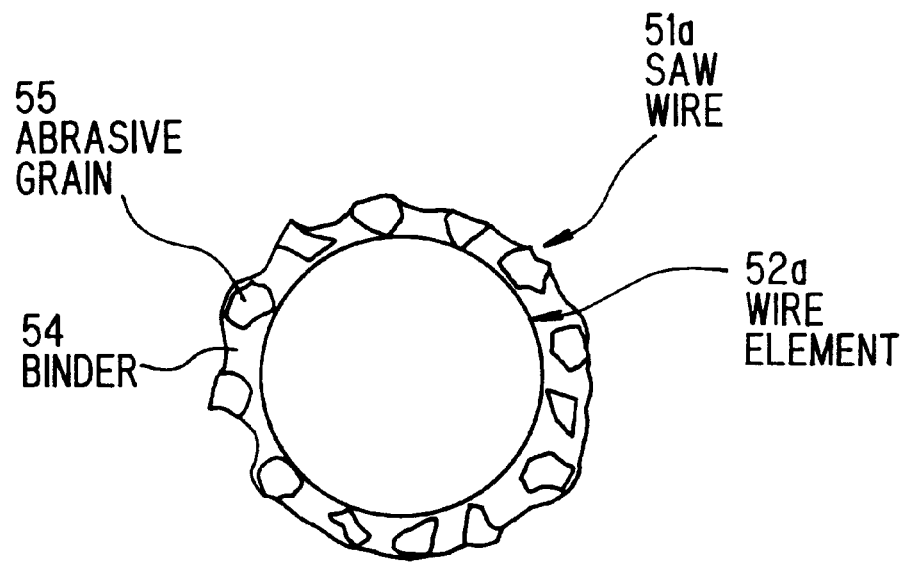
FIGS. 2A and B are cross-sectional views each showing an abrasive grain-bonded saw wire.
Figure 2B:
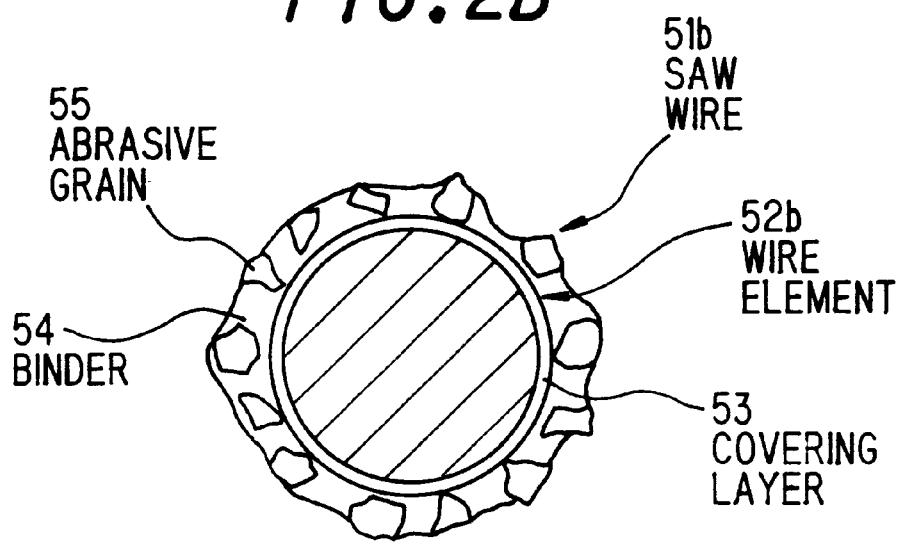

An example of the abrasive grain-bonded saw wires 4 includes the ones as shown in FIGS. 2A and 2B, and they are not particularly limited thereto (see Japanese Patent Laid-Open Nos. 31118/1996 and 328004/1996).

According to the saw wire assembly of the present invention, since a number of abrasive grain-bonded saw wires have been tentatively bonded to a tape base material in a releasable manner, it becomes easy to handle each abrasive grain-bonded saw wire, and it is also easy to release a tape base material from a saw wire assembly before cutting a material to be worked.

Next, a cutting system wherein the saw wire assembly according to the present invention is utilized will be described.

Figure 4:
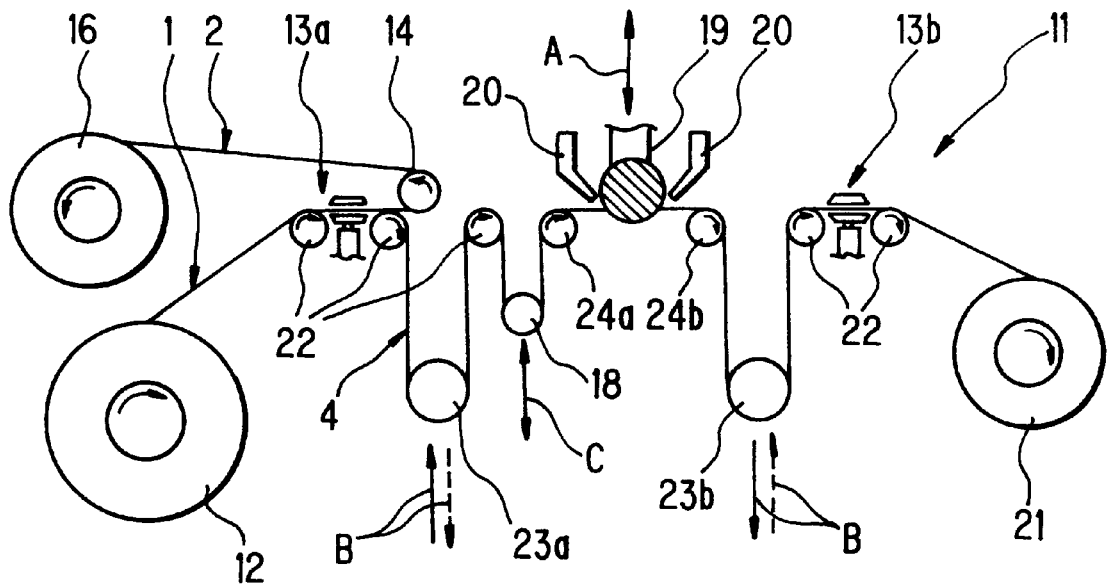
FIG. 4 is a schematic view showing a cutting system wherein the saw wire assembly according to the present invention is used.

FIG. 4 is a schematic view showing a cutting system wherein the saw wire assembly of the present invention is employed. It is to be noted that constitutional components in FIG. 4 corresponding to those of FIG. 3 are designated by the same reference numerals as those of FIG. 3.

As shown in FIG. 4, a cutting system 11 wherein the saw wire assembly is employed is essentially composed of a delivery reel 12 around which the saw wire assembly 1 shown in FIG. 3 has been wound and used for delivering continuously or intermittently the saw wire assembly 1, a tape base material-releasing roll (releasing means) 14 positioned halfway between the delivery reel 12 and a material to be worked 19 and used for releasing the tape base material 2 from the traveling saw wire assembly 1, a take-up reel 16 for taking up the tape base material 2 thus released, another take-up reel 21 for taking up each of the abrasive grain-bonded wires 4 after cutting the material to be worked 19, and a tension applying means for applying a tension to the traveling saw wire assembly 1 as well as to each of the abrasive grain-bonded saw wires 4.

The tension applying means is composed of a clamping section 13a for clamping the saw wire assembly 1 before releasing the tape base material, another clamping section 13b for clamping each of the abrasive grain-bonded wires 4 after cutting the material to be worked 19, and a tension adjusting roll 18 positioned halfway between the clamping section 13a and the material to be worked 19 and used for adjusting a tension to be applied to each of the abrasive grain-bonded saw wires 4. In this case, the tension adjusting roll 18 is disposed movably in a predetermined direction (indicated by the arrow C in FIG. 4) for adjusting a tension to be applied to each of the abrasive grain-bonded saw wires 4.

Furthermore, a synchronously swinging dancer roll (means for reciprocatively moving wires) 23a is positioned halfway between the clamping section 13a and the tension adjusting roll 18 as well as another synchronously swinging dancer roll 23b is positioned halfway between the material to be worked 19 and the clamping section 13b for moving reciprocatively each of the abrasive grain-bonded wires 4 in its longitudinal direction, respectively. These synchronously swinging dancer rolls 23a and 23b are disposed movably along predetermined directions (indicated by the arrows B and B in FIG. 4), respectively, and they move synchronously towards reverse directions to each other.

Moreover, a grooved guide roll 24a on the surface of which grooves have been defined so as to correspond to a pitch for cutting a material to be worked is positioned halfway between the tension-adjusting roll 18 and the material to be worked 19 as well as another grooved guide roll 24b prepared in accordance with the same way as that described above is positioned halfway between the material to be worked 19 and the synchronously swinging dancer roll 24b for the sake of determining a cutting width of the material to be worked 19 by means of each of the abrasive grain-bonded saw wires 4, respectively.

In addition, the material to be worked 19 is supported movably in the normal direction (indicated by the arrow A in FIG. 4) with respect to a plane constituted by the respective abrasive grain-bonded saw wires 4 (not shown) by means of supporting means (not shown) for a material to be worked. Further, a coolant-supplying means 20 for supplying the coolant to a cutting part of the material to be worked 19 is placed in the vicinity thereof.

Although it is preferred to define also grooves on the surfaces of the respective guide rolls 22, the synchronously swinging dancer rolls 23a and 23b, and the tension-adjusting roll 18, respectively, a pitch of the grooves may be substantially the same as that of the pitch for cutting a material to be worked, and so high precision of the pitch is not required as that in the grooved guide rolls 24a and 24b.

The means for reciprocatively moving wires is not limited to the synchronously swinging dancer rolls 23a and 23b, but connected rolls of a seesaw type wherein usual rolls are employed, the centers of both the rolls are connected by means of arms, respectively, and these rolls are moved vertically around the centers of both the rolls as their fulcrums may be utilized.

A manner for winding the saw wire assembly 1 around the delivery reel 12 is not particularly limited, but bobbin coiling or close coiling manner may be applied.

Since the cutting system according to the present invention wherein a saw wire assembly is used is the one which employs a delivery reel around which the saw wire assembly which had been prepared by bonding tentatively a number of abrasive grain-bonded saw wires to a tape base material has been taken up and which does not require a delivery means in every abrasive grain-bonded saw wires, a structure of the system becomes simple even though a number of wires are utilized therein, so that costs for the cutting system can be suppressed.

A cutting method wherein the saw wire assembly according to the present invention is used will be explained hereinafter by referring to FIG. 4.

First, the saw wire assembly 1 delivered from the delivery reel 12 is passed through the clamping section 13a via a guide roll 22, and then the tape base material 2 is released by means of the tape base material-releasing roll 14 from the saw wire assembly 1.

Each of the abrasive grain-bonded saw wires 4 from which the tape base material 2 was released to expose the same is wound on the synchronously swinging dancer roll 23a, the tension-adjusting roll 18, the grooved guide rolls 24a and 24b, and the synchronously swinging dancer roll 23b, in this order, through respective guide rolls, and then each of the thus exposed abrasive grain-bonded saw wires is passed through the clamping section 13b to be taken up on the take-up reel 21, whereby setup for cutting the material to be worked 19 is completed. In this case, the tape base material 2 thus released is taken up on the take-up reel 16.

Then, the clamping sections 13a and 13b are closed to clamp the saw wire assembly 1 and each of the abrasive grain-bonded saw wires 4, and at the same time, the tension-adjusting roll 18 is moved along the direction indicated by the arrow C in FIG. 4 to adjust the tension produced between the clamping sections 13a and 13b.

Thereafter, the synchronously swinging dancer rolls 23a and 23b are synchronized with each other to move in the directions indicated by the arrows B and B in FIG. 4, whereby each of the abrasive grain-bonded saw wires 4 are traveled reciprocatively in the longitudinal direction thereof, respectively, besides, the means for supporting the material to be worked is moved downwards in the direction indicated by the arrow A in FIG. 4 to cause the material to be worked 19 abutting upon each of the abrasive grain-bonded saw wires 4 traveling reciprocatively. Thereafter, the means for supporting the material to be worked is allowed to gradually travel downwards along the direction shown by the arrow A in FIG. 4 to cut the material to be worked 19 in a predetermined amount with taking a range of cutting durability of the abrasive grain-bonded saw wires 4 into consideration.

After completing a unitary cutting operation of the material to be worked 19, the clamping sections 13a and 13b are opened, at the same time, the delivery reel 12 and the take-up reel 21 are operated to supply the next portion of the saw wire assembly 1, and the newly supplied saw wire assembly 1 as well as each of the abrasive grain-bonded saw wires 4 are clamped with the clamping sections 13a and 13b, respectively, whereby a preparation for the following unitary cutting operation step is completed.

According to the cutting method wherein the saw wire assembly of the present invention is employed, respective abrasive grain-bonded saw wires have been bonded tentatively onto a tape base material in a releasable manner to form an integral tapeform material, so that it becomes easy to handle the respective abrasive grain-bonded saw wires, and workability for setting up such saw wires is improved, besides it can be intended to stabilize such setup working operation.

Furthermore, since a tape base material is released from the saw wire assembly before cutting a material to be worked to expose each of the abrasive grain-bonded saw wires, it becomes possible to apply a tension to the respective abrasive grain-bonded saw wires, whereby cutting efficiency for a material to be worked is elevated.

Next, a cutting system wherein a saw wire assembly according to a second preferred embodiment will be described.

Figure 5:
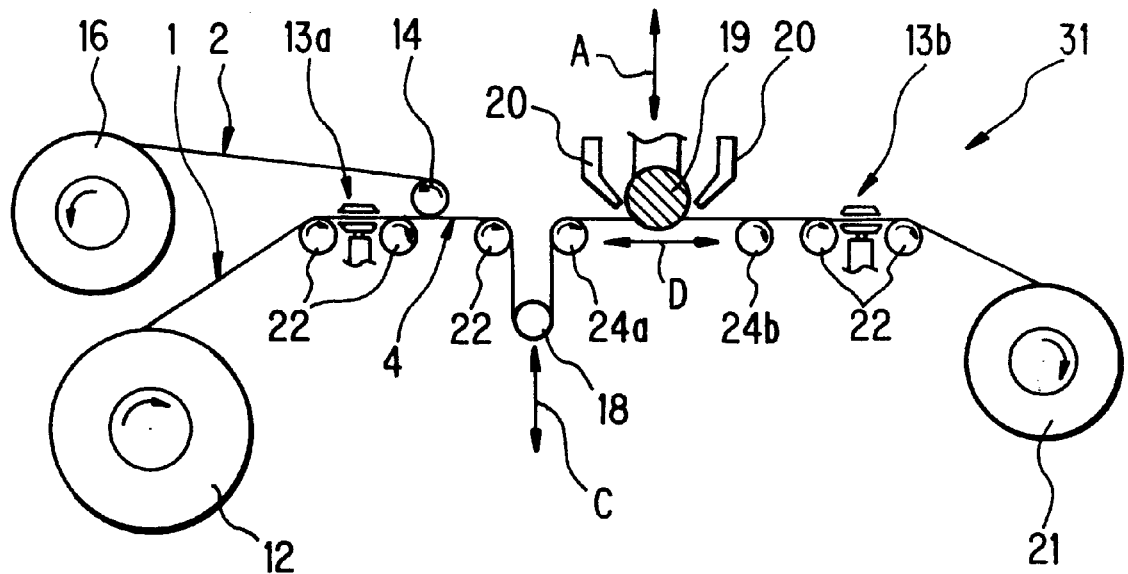
FIG. 5 is a schematic view showing a cutting system wherein the saw wire assembly according to another embodiment of the present invention is used.

FIG. 5 is a schematic view showing a cutting system wherein the saw wire assembly according to the second preferred embodiment of the present invention is employed. It is to be noted that constitutional components in FIG. 5 corresponding to those of FIG. 3 are designated by the same reference numerals as those of FIG. 3.

The cutting system 11 shown in FIG. 4 wherein the saw wire assembly according to the present invention is used is the one for cutting the material to be worked 19 by traveling reciprocatively each of the abrasive grain-bonded saw wires 4 in the longitudinal direction thereof.

On the other hand, a cutting system 31 wherein a saw wire assembly according to the second preferred embodiment is employed is provided with means (not shown) for traveling reciprocatively a material to be worked which is allowed to travel reciprocatively the material to be worked 19 in the longitudinal direction of each of the abrasive grain-bonded saw wires 4 (indicated by the arrow D in FIG. 5) instead of the synchronously swinging dancer rolls (means for traveling reciprocatively wires) 23a and 23b in the cutting system 11.

As a matter of course, the equivalent advantageous effects to that of the first embodiment can be achieved also in the second embodiment.

EXAMPLE

A saw wire assembly was prepared by the use of a tape base material of monoaxially oriented polyester tape in the longitudinal direction thereof having 0.13 mm thickness and an adhesive made of an acrylic-base resin. The resulting saw wire assembly exhibited less tape waviness and the like, no occurrence of break even if the equivalent tension to that which is to be applied in case of cutting a material to be worked was applied, and good releasability between the tape base material and the abrasive grain-bonded saw wire.

Furthermore, an ingot of gallium arsenide and an ingot of single-crystal silicon were actually cut off by the use of the saw wire assembly of the present example and conventional abrasive grain-bonded saw wires used in a multiple wire saw manner as a comparative example.

A cutting speed in the saw wire assembly of the present invention exhibited 3 to 10 times higher in case of the ingot of gallium arsenide and 2 to 5 times higher in case of the ingot of single-crystal silicon than those of grain abrasive-bonded saw wires used in a multiple saw wire manner, and as a result, it was confirmed that remarkable improvements are obtained in cutting efficiency as to the saw wire assembly of the present invention. In spite of such remarkably high speed, a condition of the cut surface of either of the ingots cut by the use of the saw wire assembly according to the present invention exhibited substantially the equivalent degree to that of the ingots cut by the use of an abrasive grain-bonded saw wire employed in the multiple wire saw manner, and any deteriorated state in the cut surface was not observed.

In conclusion, the following excellent advantages are achieved by the present invention.

(1) Since a number of abrasive grain-bonded saw wires have been bonded tentatively onto a tape base material in a releasable manner, it becomes easy to handle each of the abrasive grain-bonded saw wires, and further it is also easy to release the tape base material from the saw wire assembly of the present invention before cutting a material to be worked.

(2) The cutting system according to the present invention is the one wherein a delivery reel around which has been taken up a saw wire assembly prepared by bonding tentatively a number of abrasive grain-bonded saw wires onto a tape base material in a releasable manner is employed, so that delivery means is not required in each single abrasive grain-bonded saw wire. As a result, even though the large number of wires are employed, a structure of such system becomes simple, so that costs for a cutting system can be suppressed.

(3) Since an integral tape-shaped saw wire assembly prepared by bonding tentatively a number of abrasive grain-bonded saw wires onto a tape base material in a releasable manner is used, it becomes easy to handle each of the abrasive grain-bonded saw wires, so that workability for setting up such abrasive grain-bonded saw wires is improved, besides it can be intended to stabilize setup work of the abrasive grain-bonded saw wires.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A saw wire assembly, comprising:
   a number of abrasive grain-bonded saw wires being arranged on a long tape base material along the longitudinal direction thereof in such a way that they are disposed side by side in the direction perpendicular to said longitudinal direction; and
   these abrasive grain-bonded saw wires being bonded tentatively onto said tape base material through an adhesive in a releasable manner.

2. A cutting method by the use of an abrasive grain-bonded saw wire assembly, comprising the steps of:
   preparing said abrasive grain-bonded saw wire assembly in accordance with such a manner that a number of abrasive grain-bonded saw wires are arranged on a long tape base material along the longitudinal direction thereof in such a way that they are disposed side by side in the direction perpendicular to said longitudinal direction, and these abrasive grain-bonded saw wires are bonded tentatively onto said tape base material through an adhesive in a releasable manner; and
   cutting a material to be worked by the use of the abrasive grain-bonded saw wires contained in said saw wire assembly in accordance with such a manner that said tape base material is released from said saw wire assembly before it reaches said material to be worked, and thereafter each of the abrasive grain-bonded saw wires is allowed to reciprocatively travel while applying a tension to each of the abrasive grain-bonded saw wires, thereby to cut said material to be worked.

3. A cutting method by the use of an abrasive grain-bonded saw wire assembly, comprising the steps of:
   preparing said abrasive grain-bonded saw wire assembly in accordance with such a manner that a number of abrasive grain-bonded saw wires are arranged on a long tape base material along the longitudinal direction thereof in such a way that they are disposed side by side in the direction perpendicular to said longitudinal direction, and these abrasive grain-bonded saw wires are bonded tentatively onto said tape base material through an adhesive in a releasable manner; and
   cutting a material to be worked by the use of the abrasive grain-bonded saw wires contained in said saw wire assembly in accordance with such a manner that said tape base material is released from said saw wire assembly before it reaches said material to be worked, and thereafter said material to be worked is allowed to reciprocatively travel along the longitudinal direction of the abrasive grain-bonded saw wire while applying a tension to each of said abrasive grain-bonded saw wires, thereby to cut said material to be worked.

4. A cutting system wherein an abrasive grain-bonded saw wire assembly is used by which a material to be worked is cut off by the use of each of abrasive grain-bonded saw wires contained in said saw wire assembly prepared by arranging said abrasive grain-bonded saw wires on a long tape base material along the longitudinal direction thereof in such a way that they are disposed side by side in the direction perpendicular to said longitudinal direction, and bonding tentatively these abrasive grain-bonded saw wires onto said tape base material through an adhesive in a releasable manner, comprising:
   means for releasing said tape base material from said saw wire assembly before it reaches said material to be worked; and
   means for applying a tension to said saw wire assembly and each of said abrasive grain-bonded saw wires.

5. A cutting system wherein an abrasive grain-bonded saw wire assembly is used as defined in claim 4, further comprising:
   means for traveling reciprocatively each of said abrasive grain-bonded wires to cut off said material to be worked.

6. A cutting system wherein an abrasive grain-bonded saw wire assembly is used as defined in claim 4, further comprising:
   means for traveling reciprocatively said material to be worked along the longitudinal direction of each of said abrasive grain-bonded saw wires to cut off said material to be worked.

* * * * *